US012793913B2

(12) United States Patent
Chiang et al.

(10) Patent No.: US 12,793,913 B2
(45) Date of Patent: Nov. 10, 2026

(54) KEYBOARD WITH NOISE REDUCTION STRUCTURE

(71) Applicant: SOLID YEAR CO., LTD., New Taipei City (TW)

(72) Inventors: Li-Yang Chiang, New Taipei City (TW); Chi-Feng Liu, New Taipei City (TW)

(73) Assignee: SOLID YEAR CO., LTD., New Taipei City (TW)

( * ) Notice: Subject to any disclaimer, the term of this patent is extended or adjusted under 35 U.S.C. 154(b) by 259 days.

(21) Appl. No.: 18/804,834

(22) Filed: Aug. 14, 2024

(65) Prior Publication Data

US 2025/0062087 A1 Feb. 20, 2025

Related U.S. Application Data

(60) Provisional application No. 63/532,469, filed on Aug. 14, 2023.

(51) Int. Cl.

| | |
|---|---|
| ***H01H 13/70*** | (2006.01) |
| ***H01H 13/10*** | (2006.01) |
| ***H01H 13/14*** | (2006.01) |
| ***H01H 13/702*** | (2006.01) |
| ***H01H 13/84*** | (2006.01) |
| ***H01H 13/86*** | (2006.01) |

(52) U.S. Cl.
CPC ............ *H01H 13/70* (2013.01); *H01H 13/10* (2013.01); *H01H 13/14* (2013.01); *H01H 13/702* (2013.01); *H01H 13/84* (2013.01); *H01H 13/86* (2013.01)

(58) Field of Classification Search
CPC ........ H01H 13/70; H01H 13/10; H01H 13/14; H01H 13/702; H01H 13/84; H01H 13/86; H01H 2221/062
See application file for complete search history.

(56) References Cited

U.S. PATENT DOCUMENTS

2025/0062085 A1* 2/2025 Chiang .................. H01H 13/10
2025/0062089 A1* 2/2025 Chiang .................. H01H 13/10

FOREIGN PATENT DOCUMENTS

TW I763423 B 5/2022
TW M636771 U 1/2023

* cited by examiner

*Primary Examiner* — Lheiren Mae A Caroc
(74) *Attorney, Agent, or Firm* — Birch, Stewart, Kolasch & Birch, LLP

(57) ABSTRACT

A keyboard includes a key frame, a support frame, a circuit board, a noise reduction frame, and a plurality of keys. The noise reduction frame accommodates the key frame, the support frame, and the circuit board. The keys are inserted through the key frame and the support frame and in contact with the circuit board. As such, when the keys are pressed, the noise generated by the keys are reflected in various directions by noise reduction strips provided in the noise reduction frame, thus reducing the intensity of the noise and achieving a noise reduction effect.

11 Claims, 7 Drawing Sheets

KEYBOARD WITH NOISE REDUCTION STRUCTURE

CROSS REFERENCE TO RELATED APPLICATIONS

This non-provisional application claims the benefit under 35 U.S.C. § 119 (e) to U.S. Provisional Application No. 63/532,469, filed on Aug. 14, 2023, which is hereby expressly incorporated by reference into the present application.

BACKGROUND OF THE INVENTION

1. Field of the Invention

The present invention relates to keyboards and more particularly, to a keyboard that surrounds the relevant structure of keys through a noise reduction frame, and provides multiple noise reduction strips to reflect the noise generated when the keys are pressed, thereby reducing the intensity of the noise and making the keyboard quieter during use.

2. Description of the Related Art

Keyboards can be categorized into mechanical, membrane, and capacitive types, mainly distinguished by the switch mechanism and signal transmission method. When a user presses a key on the keyboard, the keycap impacts the frame arranged around the switch to produce noise. The noise level varies depending on the type of the switch. In an office setting, if everyone frequently uses the keyboards, the cumulative typing sounds may create significant noise, affecting concentration of employees.

TW M636771 discloses a key structure that reduces noise by adding a balance bar to the key to lower the metallic noise generated when the keycap is pressed; additionally, TW 1763423 discloses a membrane keyboard structure with a blocking key on the membrane circuit board. When the keycap is pressed, the bottom end of the first support of the scissor mechanism contacts the blocking key to prevent collisions between the scissor mechanism and the base plate, thereby reducing noise.

However, although the two aforesaid patents provide noise reduction designs, they both require changes to the original button and circuit board designs, which may increase the probability of keyboard failure due to a more complex structure. Therefore, finding a way to provide a structure that can reduce keyboard noise without significantly altering the original design is the goal of the inventors.

SUMMARY OF THE INVENTION

It is one objective of the present invention to provide a keyboard, which has excellent support to maintain a good keypress feel, effectively eliminate noise, and cushion impact force.

To attain the above objective, the keyboard of the present invention comprises a key frame, a support frame, a circuit board, a noise reduction frame, and a plurality of keys. The key frame has a plurality of key holes. The support frame has a plurality of support holes corresponding to the key holes, and a plurality of assembly portions provided at a top surface thereof and assembled with the key holes of the key frame. The circuit board is abutted with a bottom surface of the support frame. The noise reduction frame has a bottom plate, a plurality of noise reduction strips arranged on the bottom plate, and a side wall connected to a periphery of the bottom plate to form an accommodation space with the bottom plate for receiving the key frame, the support frame, and the circuit board. The keys are movably inserted through the key holes of the key frame and the support holes of the support frame and in contact with the circuit board.

In one embodiment of the present invention, a plurality of assembly slots are formed at a periphery of each of the key holes and assembled with the assembly portions of the support frame.

In one embodiment of the present invention, each of the support holes is surrounded by a plurality of the assembly portions of the support frame.

In one embodiment of the present invention, the circuit board further has a plurality of openings. The keys are inserted through the key holes of the key frame, the support holes of the support frame, and the openings of the circuit board. The outer surfaces of the keys are in contact with the circuit board.

In one embodiment of the present invention, the side wall of the noise reduction frame is provided with a plurality of noise reduction holes.

In one embodiment of the present invention, each of the noise reduction strips has an arc shape.

In one embodiment of the present invention, the noise reduction strips are arranged in a symmetrical manner relative to a central axis of the bottom plate.

In one embodiment of the present invention, the noise reduction strips are arranged irregularly.

In one embodiment of the present invention, the noise reduction strips are arranged in the same direction.

In one embodiment of the present invention, a plurality of buffer members are porous hollow structures arranged on a top surface of the key frame and arranged a bottom surface of the circuit board.

In one embodiment of the present invention, each of the buffer members has a central circular hole and a plurality of sector holes formed on an outer periphery of the central circular hole. The central circular hole and the sector holes pass through both ends of the buffer member.

Other advantages and features of the present invention will be fully understood by reference to the following specification in conjunction with the accompanying drawings, in which like reference signs denote like components of structure.

DETAILED DESCRIPTION OF THE INVENTION

Figure 1:
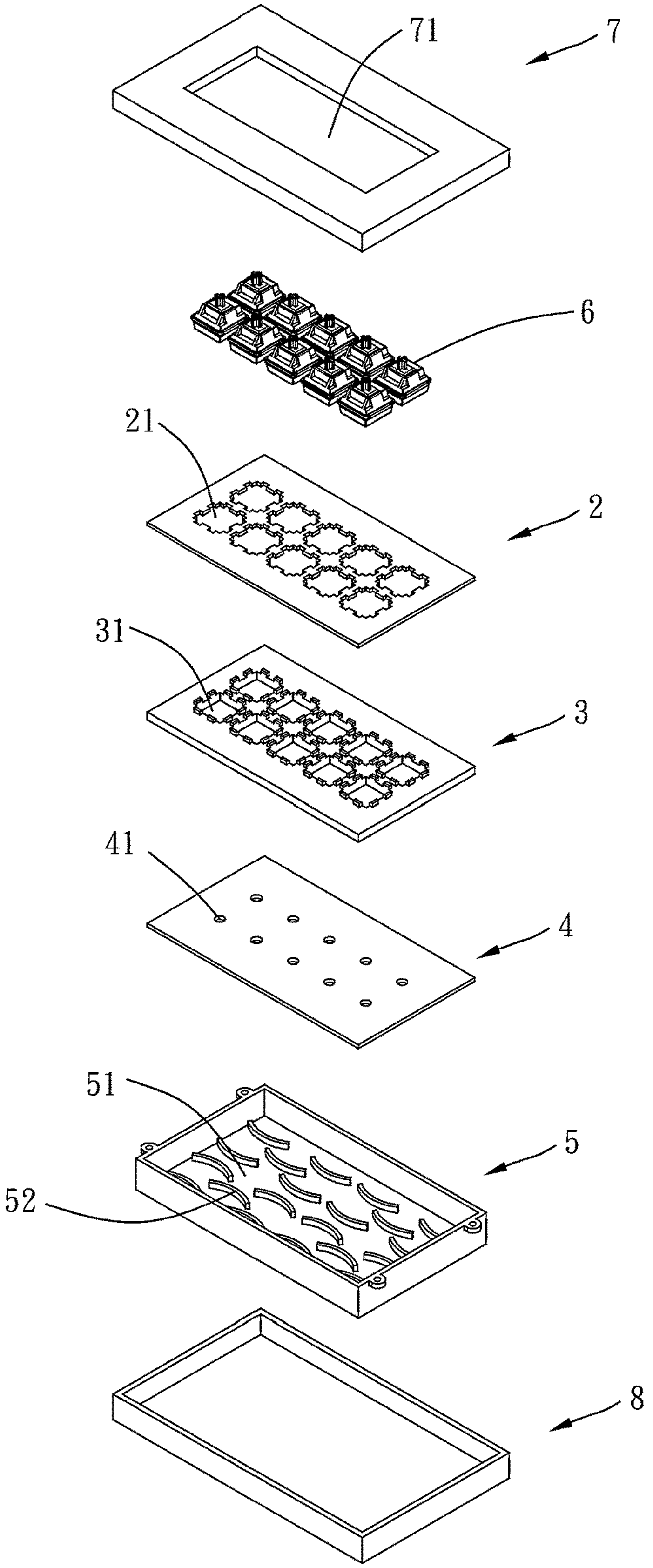
FIG. 1 is an exploded view of a keyboard of the present invention.
Figure 2:
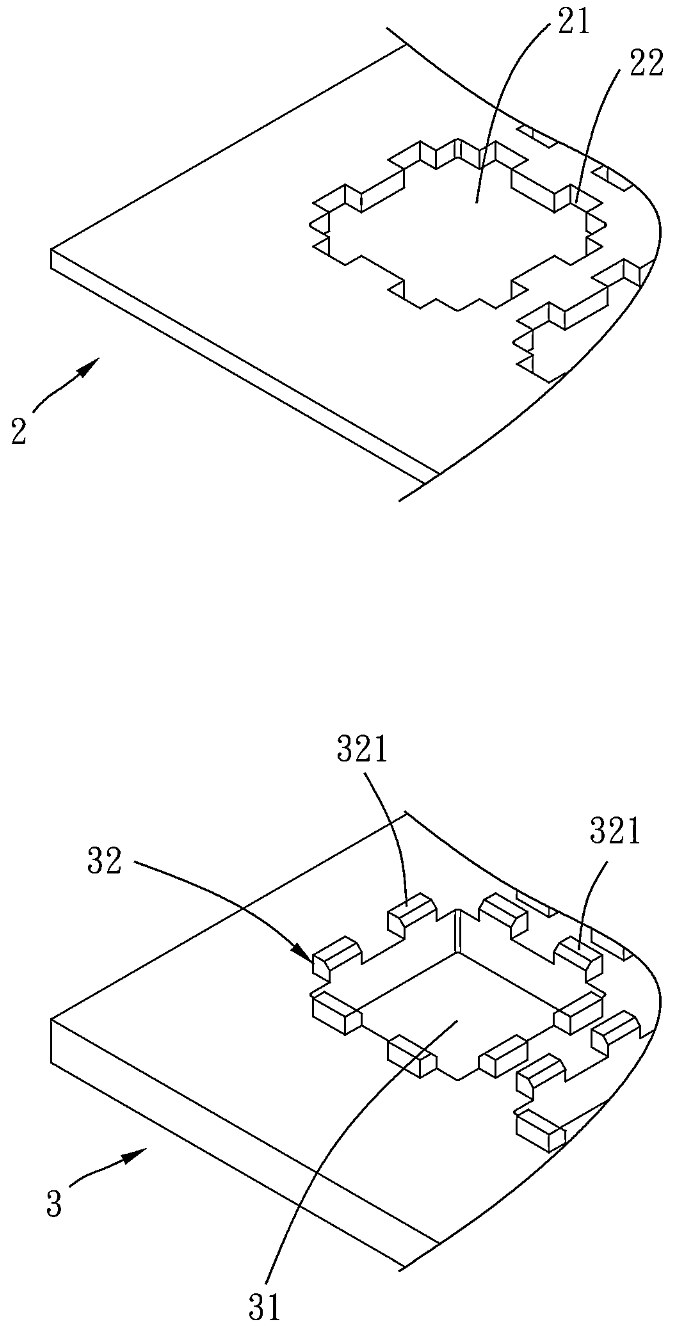
FIG. 2 is an enlarged view of the key frame and the support frame provided by the keyboard of the present invention.
Figure 3:
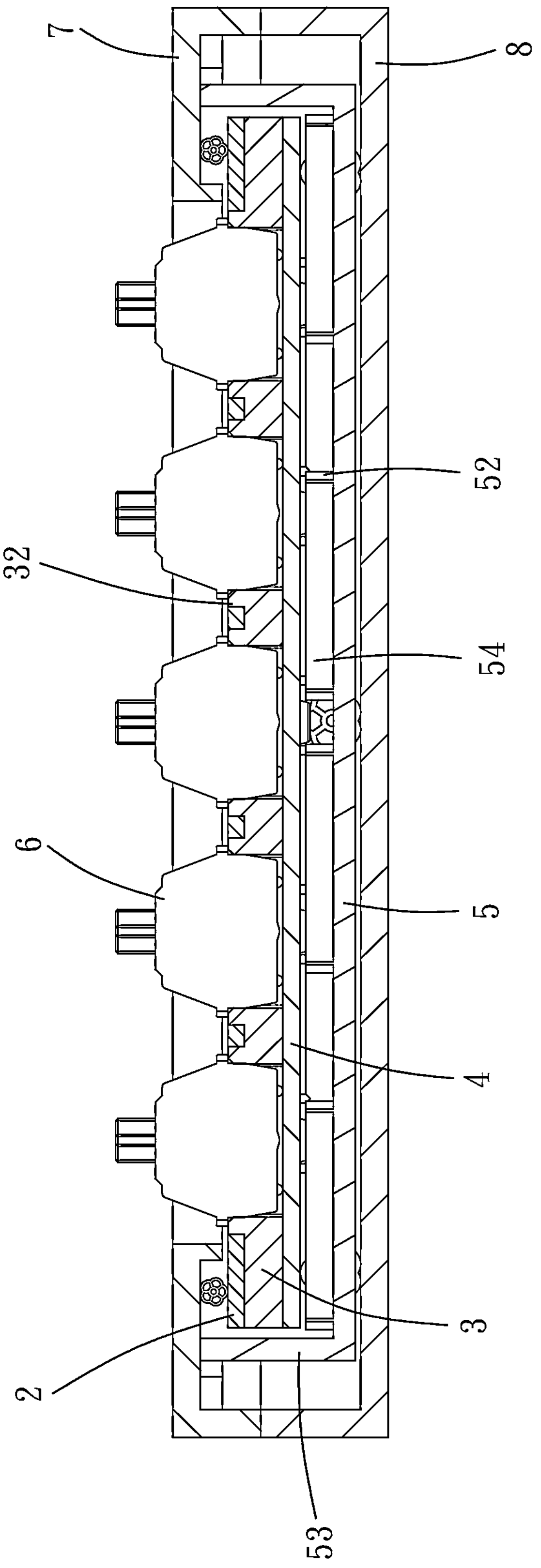
FIG. 3 is a sectional view of the keyboard of the present invention.

Referring to FIGS. 1-3, a keyboard 1 of the present invention comprises a key frame 2, a support frame 3, a circuit board 4, a noise reduction frame 5, and a plurality of keys 6.

The key frame 2 includes a plurality of key holes 21. The key holes 21 pass through the top and bottom surfaces of the key frame 2. Each key hole 21 is provided with two assembly slots 22 on each side. That is, each of the key holes 21 is surrounded by eight assembly slots 22.

The support frame 3 includes a plurality of support holes 31 and a plurality of assembly portions 32. The support holes 31 pass through the top and bottom surfaces of the support frame 3, and the number of the support hole corresponds to the number of the key hole 21 of the key frame 2. Further, the assembly portion 32 is formed by a plurality of protrusions 321 protruding from the top surface of the support frame 3 and located at the periphery of the support hole 31. The assembly portions 32 of the support frame 3 are assembled with the assembly slots 22 of the key frame 2, and the support holes 31 of the support frame 3 communicate with the key holes 21 of the key frame 2. In this embodiment, eight assembly slots 22 are arranged on the periphery of each of the key holes 21, so that the assembly portion 32 is also provided with eight protrusions 321 on the periphery of each of the support holes 31. The protrusions 321 are engaged with the assembly slots 22.

The circuit board 4 is abutted with the bottom surface of the support frame 3 and provided with a plurality of openings 41. The openings 41 pass through the top and bottom surface of the circuit board 4.

Figure 4:
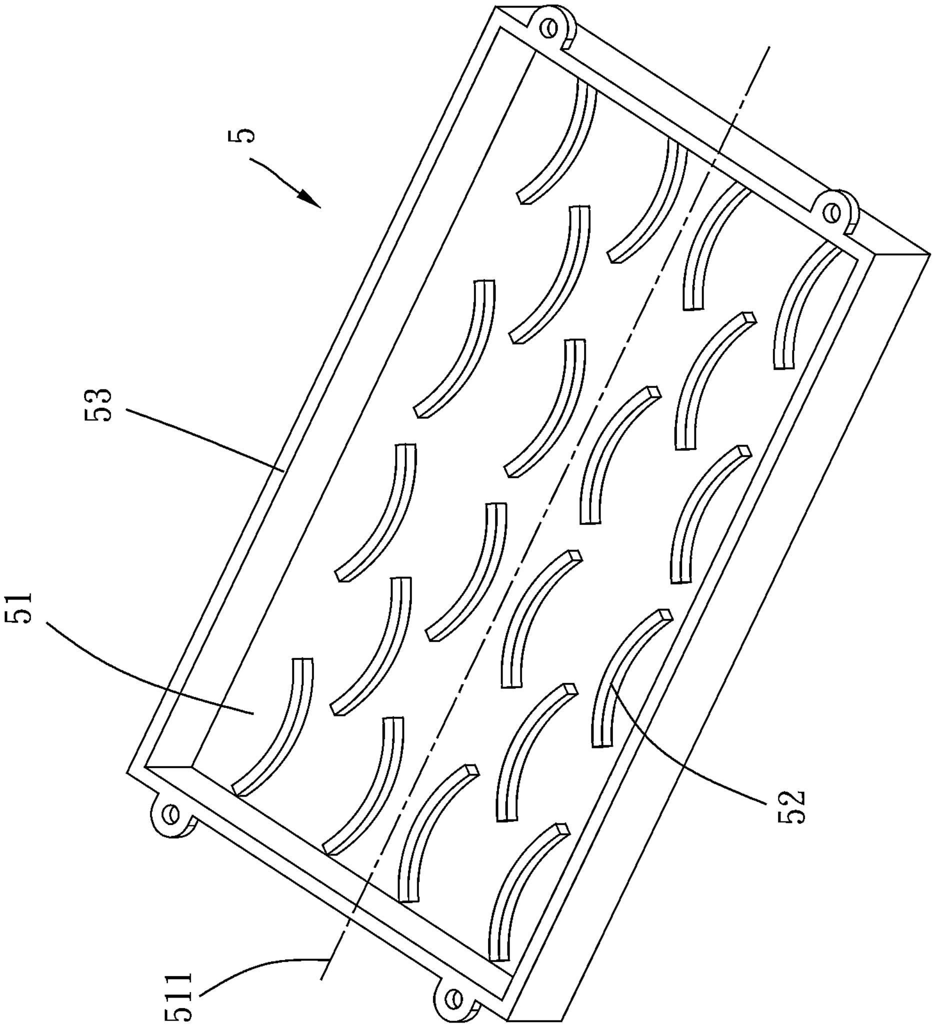
FIG. 4 is a perspective view of the noise reduction frame provided by the keyboard of first embodiment of the present invention, in which the noise reduction frame has no noise reduction hole.

The noise reduction frame 5 has a bottom plate 51, a plurality of noise reduction strips 52, and a side wall 53. The noise reduction frame 5 accommodates the key frame 2, the support frame 3, and the circuit board 5 through an accommodation space 54 formed by the bottom plate 51 and the side wall 53. In this embodiment, the bottom plate 51 is quadrangular, and the side wall 53 are perpendicular to the four sides of the bottom plate 51. The noise reduction strip 52 can be made into an arc shape and disposed on the top surface of the bottom plate 51. All of the noise reduction strips 52 are divided into half and arranged in a symmetrical manner relative to a central axis 511 of the bottom plate 51, as shown in FIG. 4. Alternatively, the noise reduction strips 52 can be arranged irregularly (not shown) or arranged in the same direction (not shown). The arrangement is primarily designed to allow the noise reduction strips 52 to irregularly reflect sound waves in multiple directions. The more times the sound waves are reflected, the better the noise reduction effect.

Figure 5:
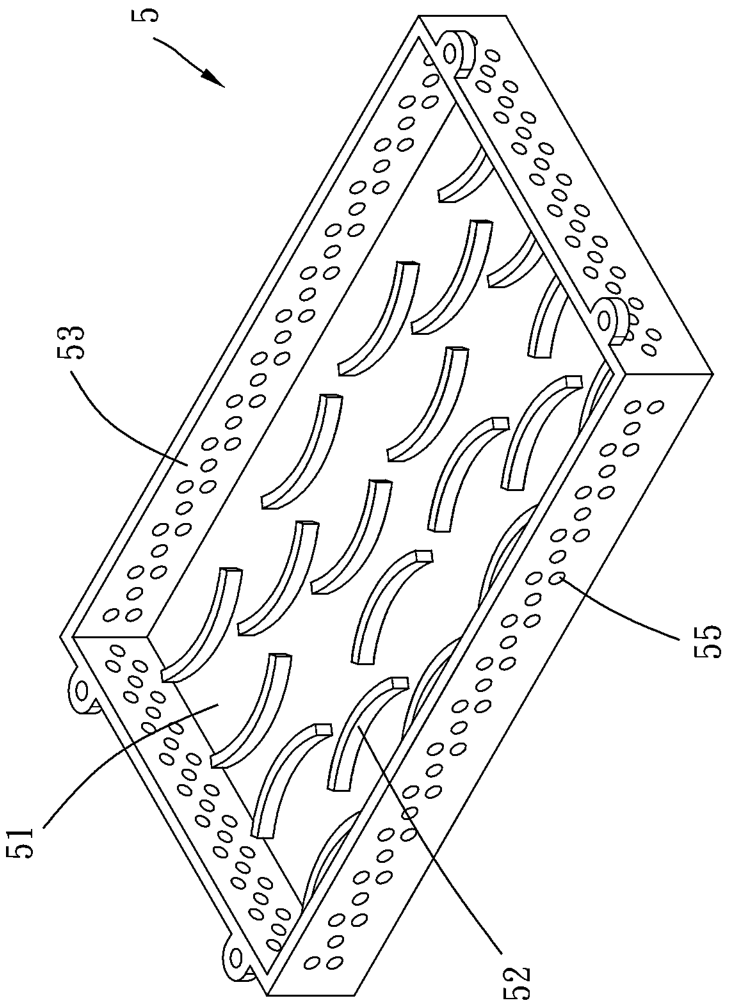
FIG. 5 is a perspective view of the noise reduction frame provided by the keyboard of first embodiment of the present invention, in which the noise reduction frame has noise reduction holes.

Furthermore, the side wall 53 of the noise reduction frame 5 can optionally be provided with multiple noise reduction holes 55 or no noise reduction hole 55. The noise reduction hole 55 passes through both sides of the side wall 53. FIGS. 4 and 5 respectively show the noise reduction frame 5 without the noise reduction hole 55 and with the noise reduction hole 55.

The number of the key 6 corresponds to the number of the key hole 21 and the support hole 31. The key 6 is inserted in the key hole 21 of the key frame 2 and the support hole 31 of the support frame 3, and the bottom of the key 6 is in contact with the circuit board 4. When the key 6 is pressed, the internal spring (not shown) is compressed, and when the key 6 is released, the spring provides a rebound force to restore the key 6. Since the circuit board 4 has the opening 41, the outer surface of the bottom of the key 6 further passes through the opening 41 of the circuit board 4 to be in contact with the circuit board 4.

Furthermore, the key frame 2, the support frame 3, the circuit board 4, the noise reduction frame 5, and the keys 6 are installed in a housing assembled by a top cover 7 and a bottom cover 8. A hollow opening 71 is formed at the center of the top cover 7 to expose the keys 6 for the user to press them.

When the user taps the keycap (not shown) of the key 6, the spring inside the key 6 is compressed, and the bottom edge of the keycap hits the key frame 2 and the assembly portion 32 of the support frame 3 at the same time to produces noise. Since the key frame 2 and the support frame 3 are received in the accommodation space 54 of the noise reduction frame 5, the sound waves of the noise are surrounded by the noise reduction frame 5, transmitted to the openings 41 of the circuit board 4 through the key frame 2 and the support frame 3, and reflected by the inner circumferential surface of the openings 41, thereby reducing the intensity of the sound waves. The sound waves are then transmitted to the noise reduction strips 52 provided on the bottom plate 51. The arc-shaped noise reduction strips 52 reflect the sound waves in all directions. The reflected sound waves are then transmitted to another noise reduction strip 52 and reflected again. If the sound waves are transmitted to the side wall 53 of the noise reduction frame 5, the sound waves will also be reflected by the inner peripheral surfaces of the noise reduction holes 55 or absorbed by the side wall 53.

Sound wave is a type of longitudinal wave that can be attenuated through diffusion and absorption during transmission. In the present invention, the sound waves of the noise undergo multiple reflections, which can also be seen as multiple diffusions. With each reflection, the sound waves are attenuated due to absorption or diffusion by the noise reduction strips 52. In this way, the sound waves of the noise are repeatedly reflected and absorbed by the openings 41 of the circuit board 4, the noise reduction strips 52 of the noise reduction frame 5, and the noise reduction holes 55 of the noise reduction frame 5, so that the sound waves of the noise can be greatly attenuated in the noise reduction frame 5, making the noise difficult to be transmitted to the outside of the keyboard 1. The user will not be disturbed by the noise of tapping the keyboard 1.

In addition, the support frame 3 provided between the key frame 2 and the circuit board 4 can also provide a noise reduction effect. The key 6 is surrounded by the assembly portions 32 of the support frame 3, as shown in FIG. 3, so that before transmitted to the circuit board 4, the sound waves of the noise need to pass through the support frame 3 first. The support frame 3, which is thicker than the key frame 2 and the circuit board 4, can absorb the vibration of the keys 6 hitting the key frame 2 and absorb part of the sound waves.

Figure 6:
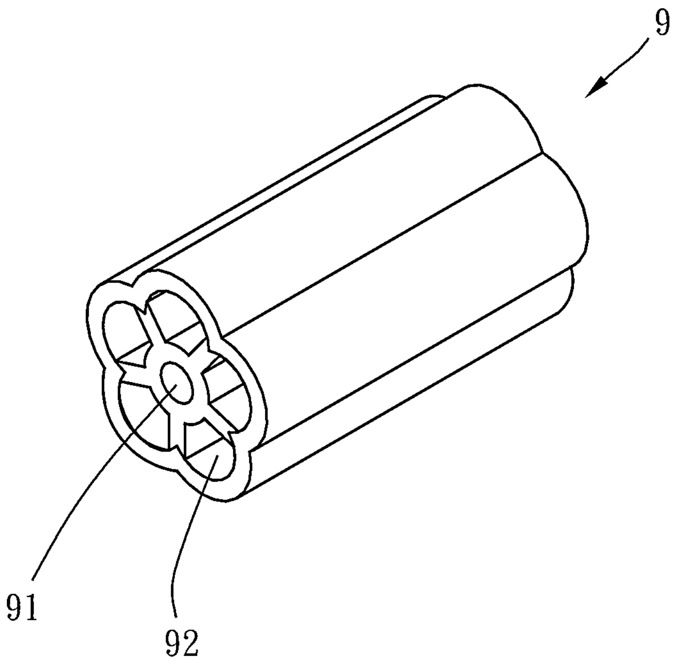
FIG. 6 is a perspective view of the buffer member provided by the keyboard of the present invention.

Furthermore, in this embodiment, a plurality of buffer members 9 can be arranged between the top surface of the key frame 2 and the bottom surface of the top cover 7, and arranged between the bottom surface of the circuit board 4 and the top surface of the bottom plate 51 of the noise reduction frame 5. The buffer member 9 is made of soft materials and forms a porous hollow structure with a central circular hole 91 and a plurality of sector holes 92 arranged on the outer periphery of the central circular hole 91. The central circular hole 91 and the sector holes 92 pass through both ends of the buffer member 9. As shown in FIG. 6, this porous hollow structure can increase the elasticity of the buffer member 9. When the key 6 is struck, in addition to the noise generated by the key 6 hitting the key frame 2, vibration will also be generated. The vibration is transmitted to the buffer member 9 provided on the top surface of the key frame 2 and the support frame 3 through the key frame 2, and the vibration is then transmitted to the buffer member 9 provided on the bottom surface of the circuit board 4 through the support frame 3. The vibration can be weakened through the porous hollow structure and elasticity of the buffer member 9.

Figure 7:
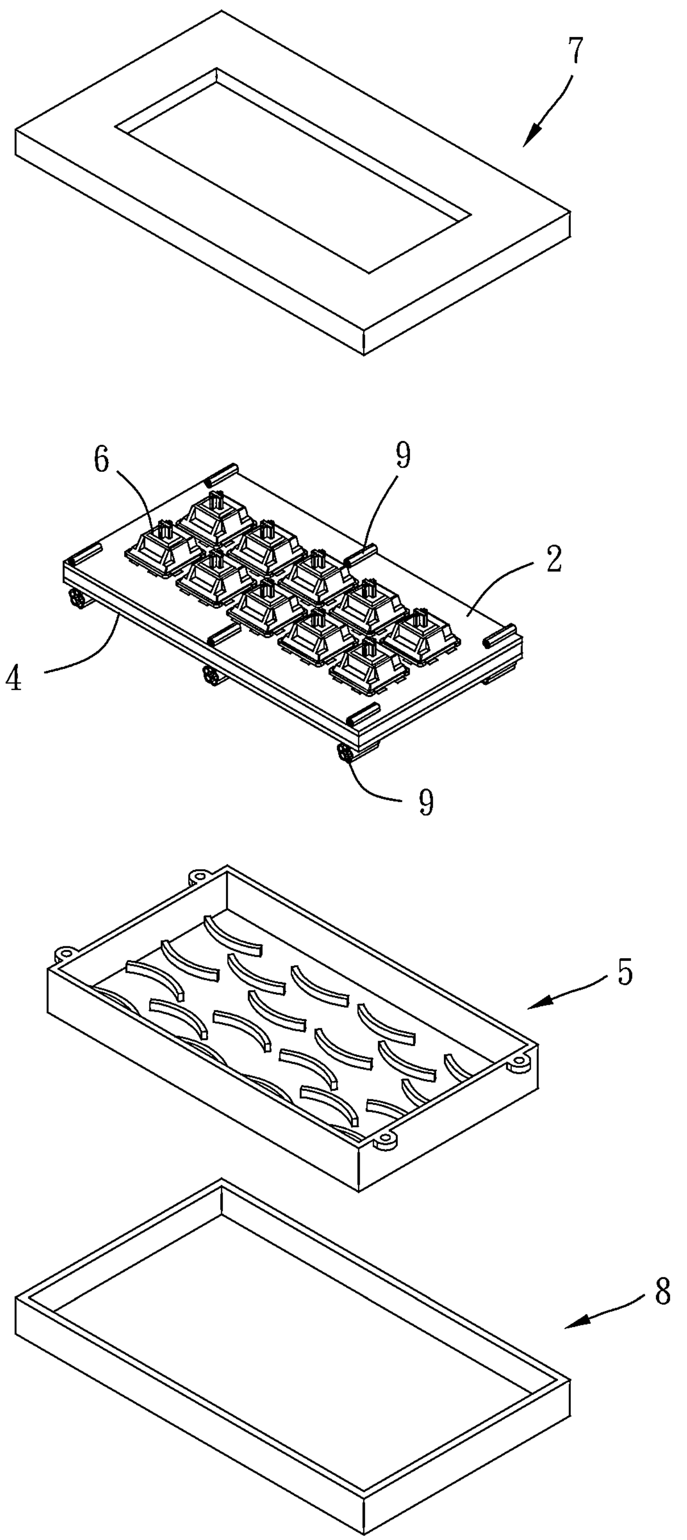
FIG. 7 is an exploded view of the keyboard of the present invention, showing the arrangement of the buffer member.

The buffer member 9 may, for example, be configured in different sizes. A small-size buffer member 9 is provided between the key frame 2 and the top cover 7, and a large-size buffer member 9 is provided between the circuit board 4 and the noise reduction frame 5. FIG. 7 shows that this configuration can achieve better buffering capacity and maintain good tactile feedback of the keyboard 1.

Based on the above implementation description, it can be seen that compared to the prior art, the present invention has the following advantages:

1. The keyboard 1 of the present invention can suppress the sound waves of the noise generated when the keyboard 1 is struck. The noise reduction strips 52 in the noise reduction frame 5 reflect the sound waves multiple times, causing the intensity of the sound waves to gradually attenuate with each reflection. This means that the noise produced by striking the keyboard 1 is contained within the noise reduction frame 5 so as not to be transmitted to the outside of the keyboard 1, thereby achieving a noise reduction effect.
2. The keyboard 1 of the present invention is provided with the support frame 3 between the key frame 2 and the circuit board 4. The noise and vibration generated by striking the keyboard 1 are transmitted to the support frame 3, which can absorb both the noise and vibration. Therefore, it serves the dual function of shock absorption and noise reduction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A keyboard comprising:

a key frame having a plurality of key holes;

a support frame having a plurality of support holes corresponding to the key holes, and a plurality of assembly portions provided at a top surface thereof and assembled with the key holes of the key frame;

a circuit board abutted with a bottom surface of the support frame;

a noise reduction frame having a bottom plate, a plurality of noise reduction strips arranged on the bottom plate, and a side wall connected to a periphery of the bottom plate to form an accommodation space with the bottom plate for receiving the key frame, the support frame, and the circuit board; and a plurality of keys movably inserted through the key holes of the key frame and the support holes of the support frame and contacting with the circuit board.

2. The keyboard as claimed in claim 1, wherein a plurality of assembly slots are formed at a periphery of each of the key holes and assembled with the assembly portions of the support frame.

3. The keyboard as claimed in claim 1, wherein each of the support holes is surrounded by the plurality of the assembly portions of the support frame.

4. The keyboard as claimed in claim 1, wherein the circuit board further has a plurality of openings; the keys are inserted through the key holes of the key frame, the support holes of the support frame, and the openings of the circuit board; outer surfaces of the keys are in contact with the circuit board.

5. The keyboard as claimed in claim 1, wherein the side wall of the noise reduction frame is provided with a plurality of noise reduction holes.

6. The keyboard as claimed in claim 1, wherein each of the noise reduction strips has an arc shape.

7. The keyboard as claimed in claim 6, wherein the noise reduction strips are arranged in a symmetrical manner relative to a central axis of the bottom plate.

8. The keyboard as claimed in claim 6, wherein the noise reduction strips are arranged irregularly.

9. The keyboard as claimed in claim 6, wherein the noise reduction strips are arranged in a same direction.

10. The keyboard as claimed in claim 1, further comprising a plurality of buffer members are porous hollow structures arranged on a top surface of the key frame and arranged on a bottom surface of the circuit board.

11. The keyboard as claimed in claim 10, wherein each of the buffer members has a central circular hole and a plurality of sector holes formed on an outer periphery of the central circular hole; the central circular hole and the sector holes pass through both ends of the buffer member.

* * * * *